US009854247B2

(12) United States Patent
Ando

(10) Patent No.: US 9,854,247 B2
(45) Date of Patent: Dec. 26, 2017

(54) MOVING IMAGE COMPRESSION DEVICE, MOVING IMAGE DECODING DEVICE, IMAGE COMPRESSION DEVICE, IMAGE DECODING DEVICE, IMAGING DEVICE, AND NON-TRANSITORY MEDIUM STORING PROGRAM

(71) Applicant: NIKON CORPORATION, Tokyo (JP)

(72) Inventor: Ichiro Ando, Yokosuka (JP)

(73) Assignee: NIKON CORPORATION, Tokyo (JP)

( * ) Notice: Subject to any disclaimer, the term of this patent is extended or adjusted under 35 U.S.C. 154(b) by 232 days.

(21) Appl. No.: 14/412,337

(22) PCT Filed: Jul. 8, 2013

(86) PCT No.: PCT/JP2013/004219
§ 371 (c)(1),
(2) Date: Jun. 25, 2015

(87) PCT Pub. No.: WO2014/010224
PCT Pub. Date: Jan. 16, 2014

(65) Prior Publication Data
US 2015/0319444 A1    Nov. 5, 2015

(30) Foreign Application Priority Data

Jul. 9, 2012  (JP) ................................ 2012-153372
Jul. 9, 2012  (JP) ................................ 2012-153373

(51) Int. Cl.
*H04N 19/88*    (2014.01)
*H04N 19/61*    (2014.01)
(Continued)

(52) U.S. Cl.
CPC ......... *H04N 19/159* (2014.11); *H04N 19/172* (2014.11); *H04N 19/176* (2014.11);
(Continued)

(58) Field of Classification Search
None
See application file for complete search history.

(56) References Cited

U.S. PATENT DOCUMENTS 6,744,929 B1    6/2004  Okada
8,817,120 B2 *  8/2014  Silverstein ............. H04N 5/365
                                                    348/208.14

(Continued)

FOREIGN PATENT DOCUMENTS

JP    2000-244935 A    9/2000
JP    2005-286415 A    10/2005
(Continued)

OTHER PUBLICATIONS

Sep. 24, 2013 International Search Report issued in International Application No. PCT/JP2013/004219.
(Continued)

*Primary Examiner* — Reza Aghevli
(74) *Attorney, Agent, or Firm* — Oliff PLC

(57) ABSTRACT

A moving image compression device has an obtaining unit, an image conversion unit, and a compression processing unit. The obtaining unit obtains a RAW moving image having plural frames associated in an order of imaging, the frames having pixels of three different color components which are disposed periodically according to a color array with two rows and two columns. The image conversion unit separates, in a target frame, a first pixel group corresponding to a first color component of odd rows and a second pixel group corresponding to the first color component of even rows, and alternately arrays, in a time base direction, a first image including the first pixel group and a second image including the second pixel group. The compression processing unit performs inter-frame prediction coding compression on the first image and the second image.

19 Claims, 14 Drawing Sheets

(51) Int. Cl.
  *H04N 19/186* (2014.01)
  *H04N 19/159* (2014.01)
  *H04N 19/172* (2014.01)
  *H04N 19/182* (2014.01)
  *H04N 19/176* (2014.01)
  *H04N 19/523* (2014.01)

(52) U.S. Cl.
  CPC ......... *H04N 19/182* (2014.11); *H04N 19/186* (2014.11); *H04N 19/523* (2014.11); *H04N 19/61* (2014.11); *H04N 19/88* (2014.11)

(56) References Cited

U.S. PATENT DOCUMENTS

| | | | | |
|---|---|---|---|---|
| 2004/0028271 | A1* | 2/2004 | Pollard | H04N 1/58 382/162 |
| 2005/0213812 | A1* | 9/2005 | Ishikawa | H04N 1/64 382/166 |
| 2009/0257491 | A1 | 10/2009 | Kondo et al. | |
| 2010/0177246 | A1* | 7/2010 | Yong | H04N 5/341 348/580 |
| 2013/0182756 | A1* | 7/2013 | Furlan | G06T 5/002 375/240.02 |
| 2014/0078338 | A1* | 3/2014 | Hatano | H04N 9/045 348/222.1 |
| 2014/0085498 | A1* | 3/2014 | Hatano | H04N 9/07 348/221.1 |

FOREIGN PATENT DOCUMENTS

| | | |
|---|---|---|
| JP | 2011-041144 A | 2/2011 |
| WO | 2007/010901 A1 | 1/2007 |
| WO | 2008/132791 A1 | 11/2008 |
| WO | 2009/087783 A1 | 7/2009 |

OTHER PUBLICATIONS

Jan. 13, 2015 International Preliminary Report on Patentability issued in International Application No. PCT/JP2013/004219.

May 24, 2017 Office Action issued in Chinese Application No. 201380046524.8.

* cited by examiner

[FIG. 1]
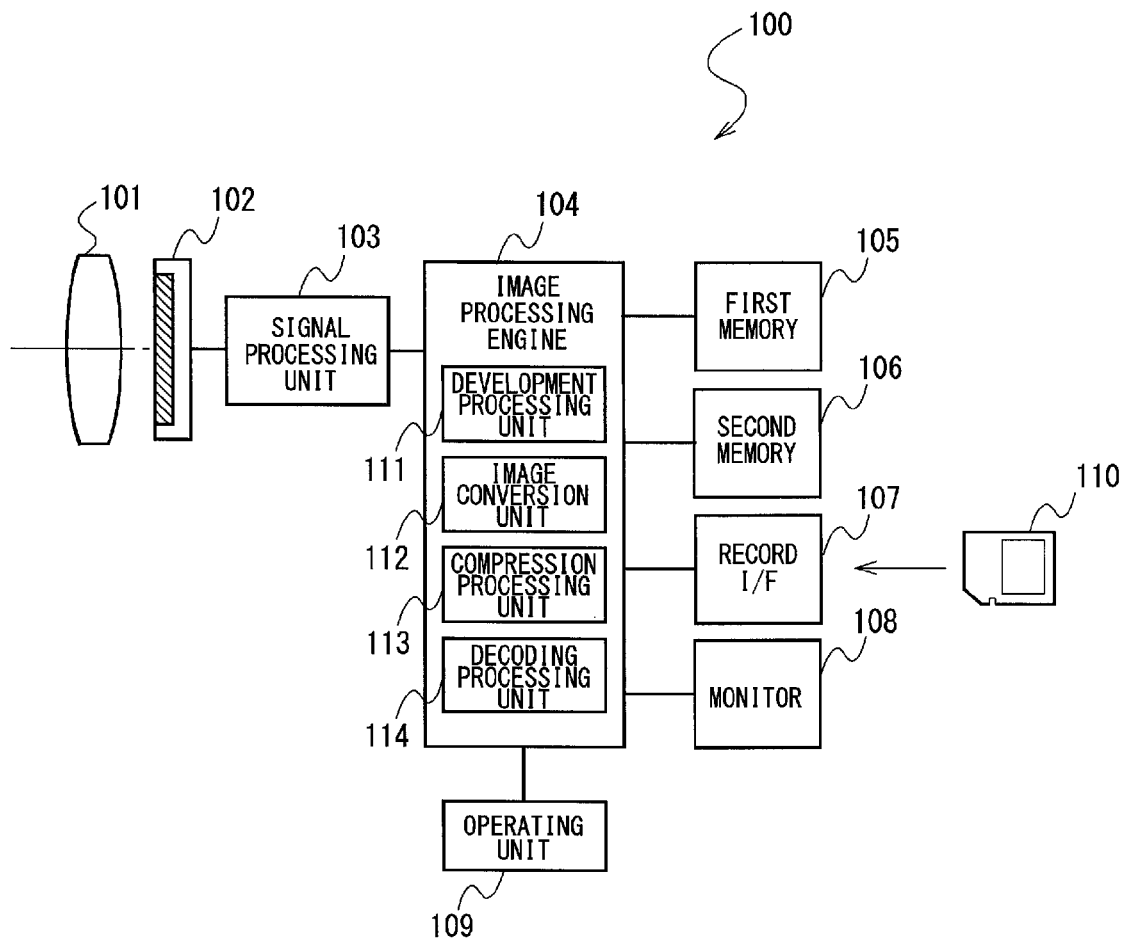
[FIG. 2]
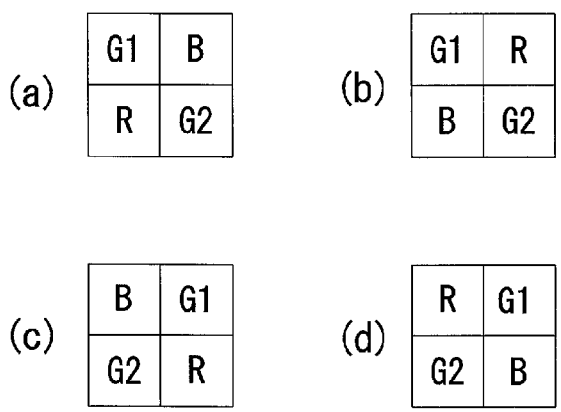

[FIG. 3]
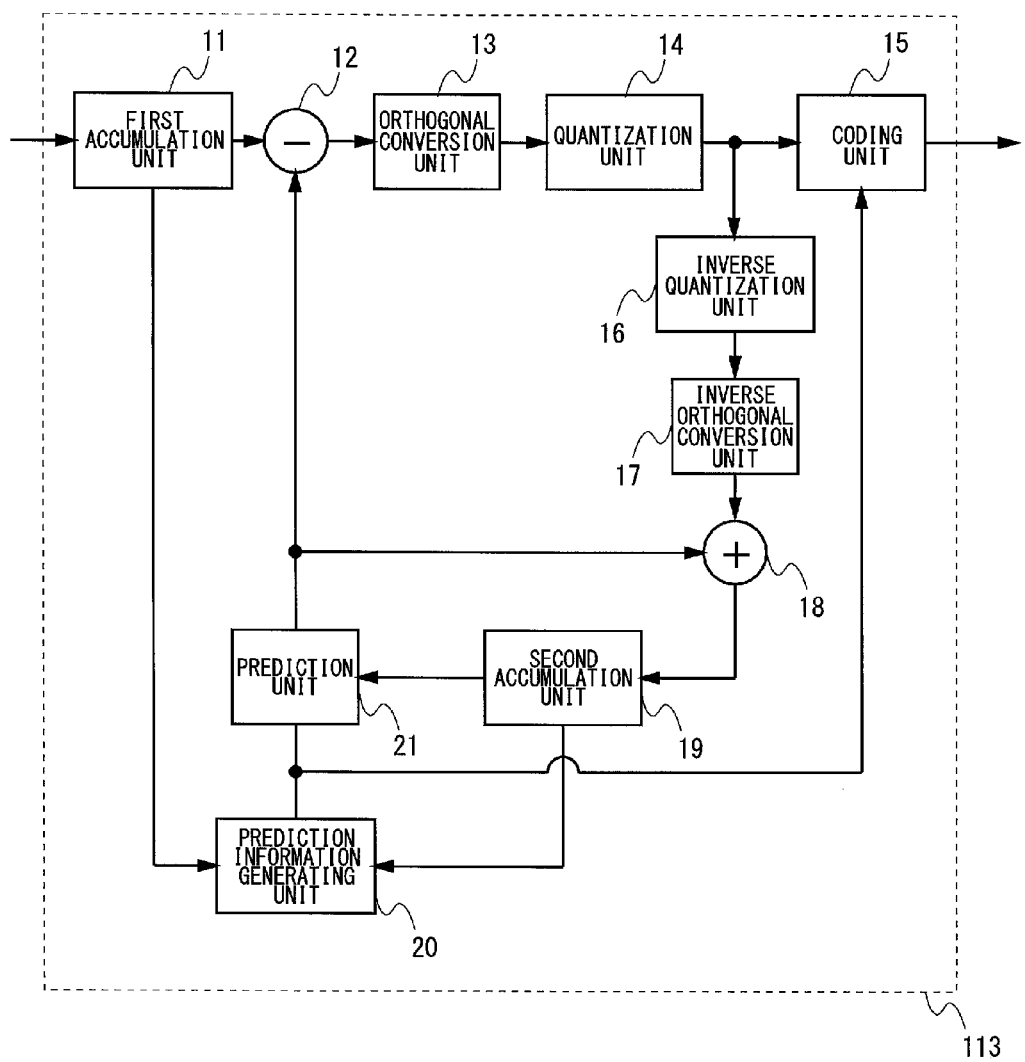

[FIG. 4]
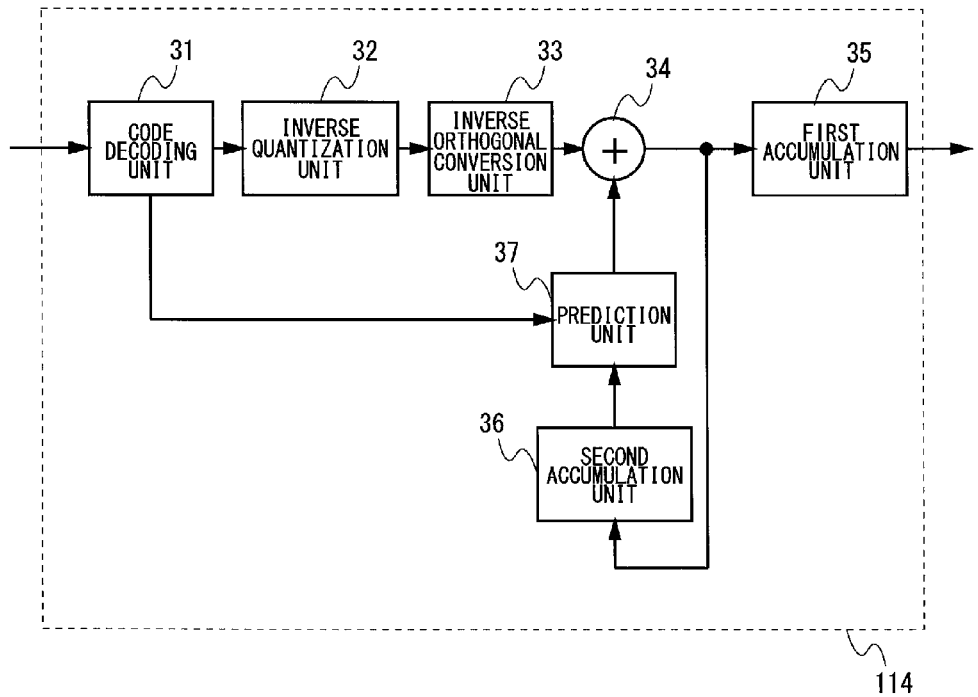
[FIG. 5]
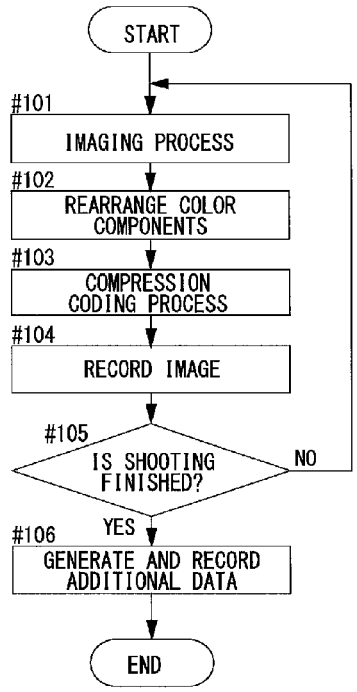

[FIG. 6]
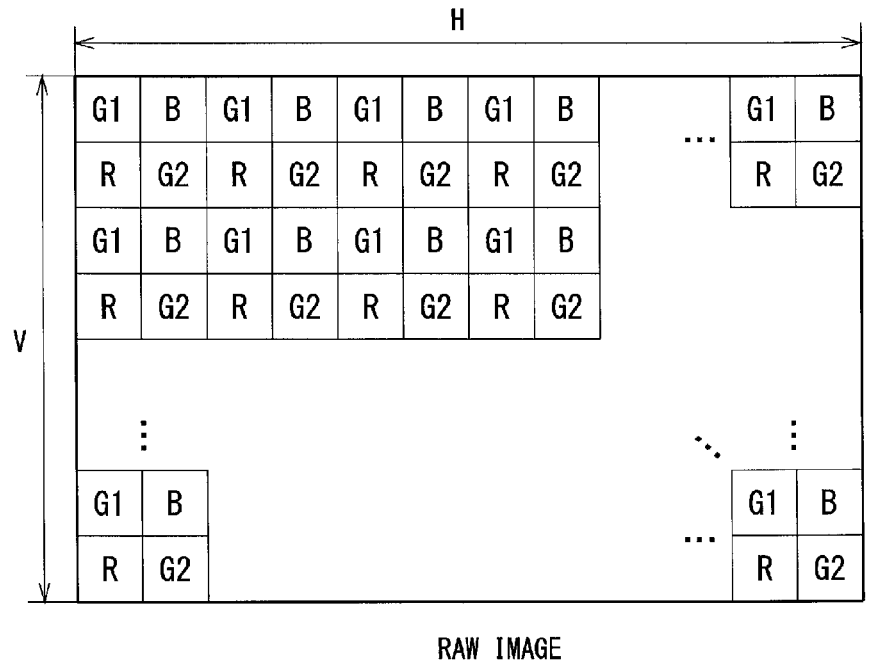
RAW IMAGE
[FIG. 7]
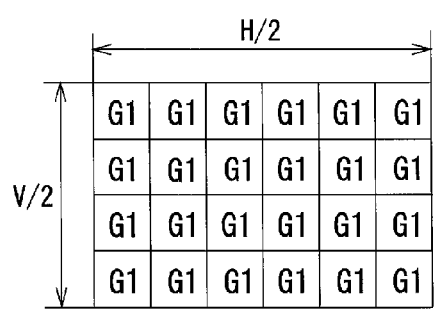
(a): G1 IMAGE
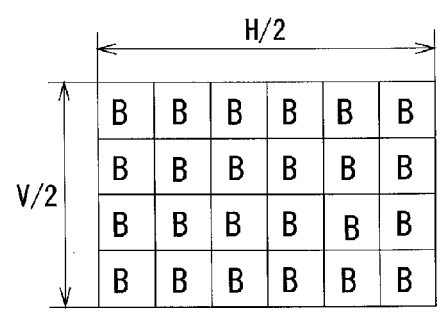
(b): B IMAGE
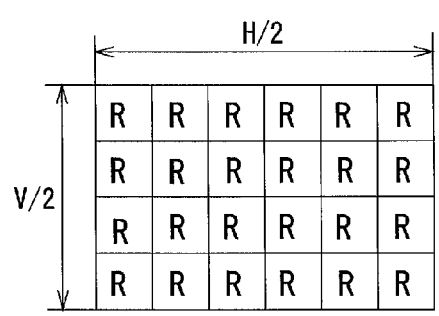
(c): R IMAGE
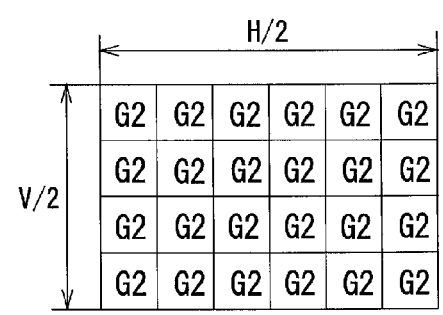
(d): G2 IMAGE

[FIG. 8]
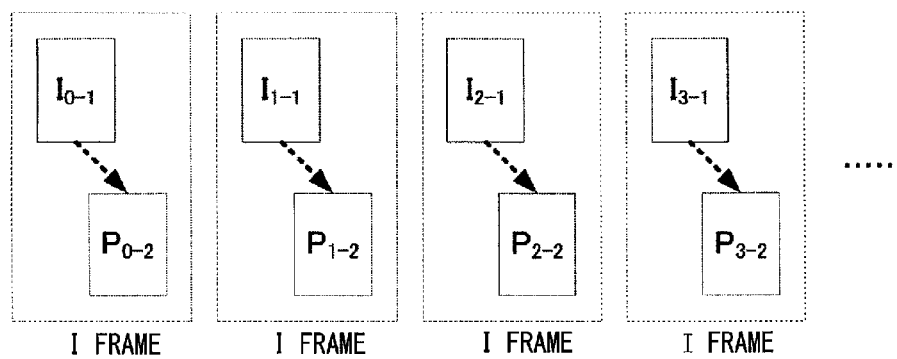
[FIG. 9]
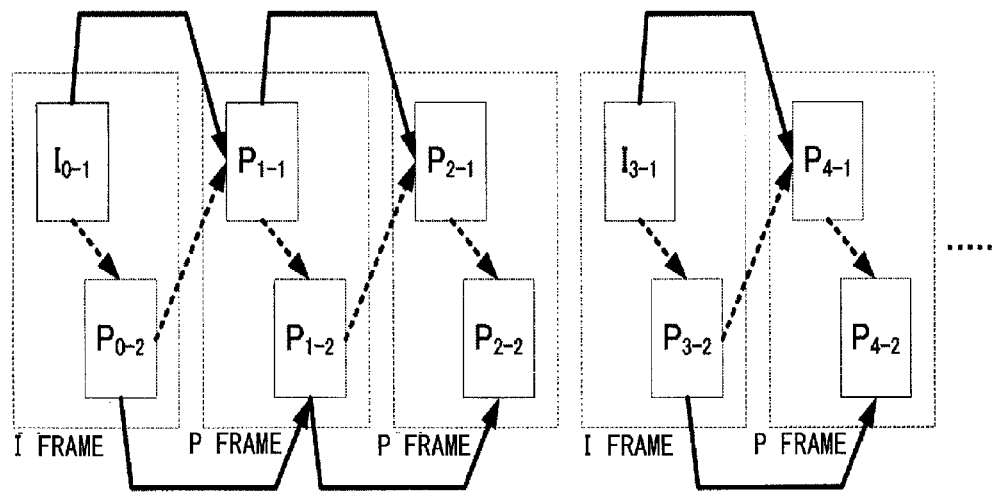

[FIG. 10]
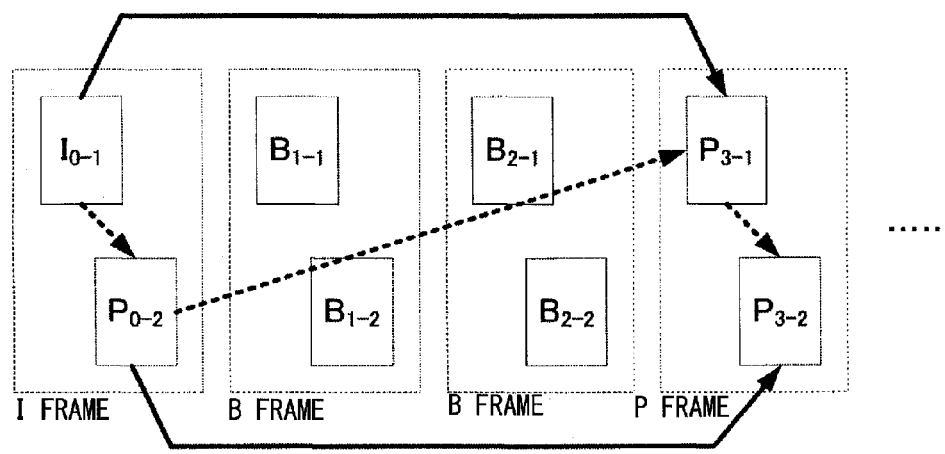
[FIG. 11]
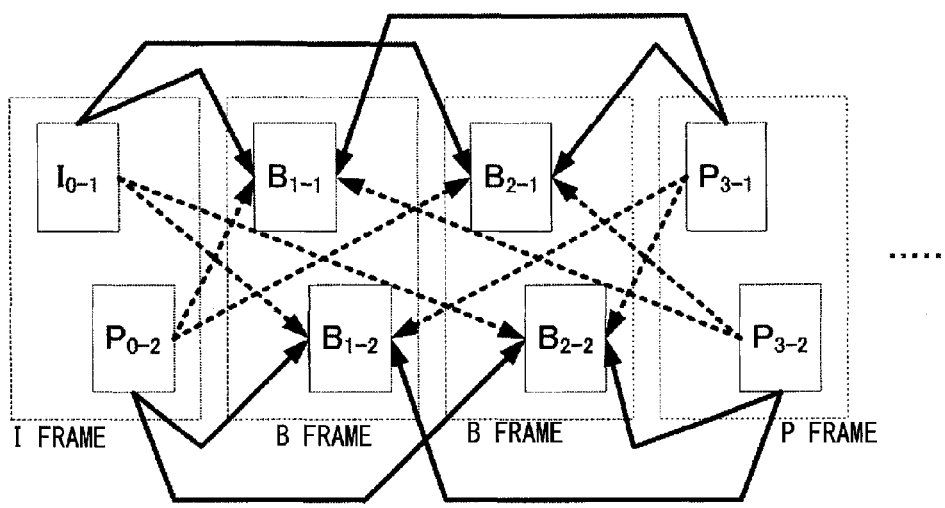

[FIG. 12]
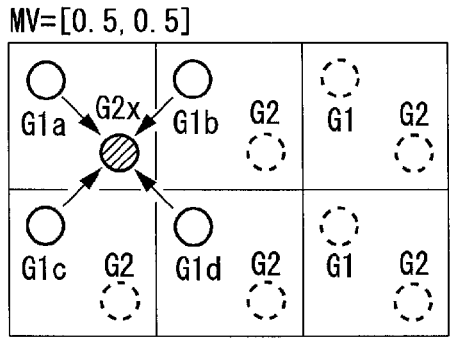
[FIG. 13]
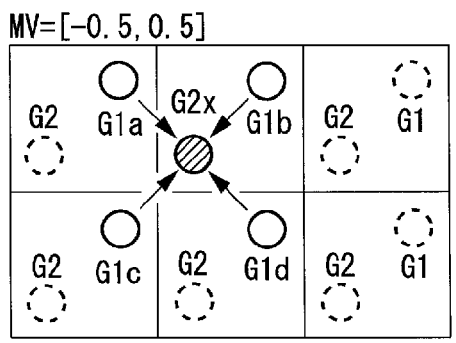
[FIG. 14]
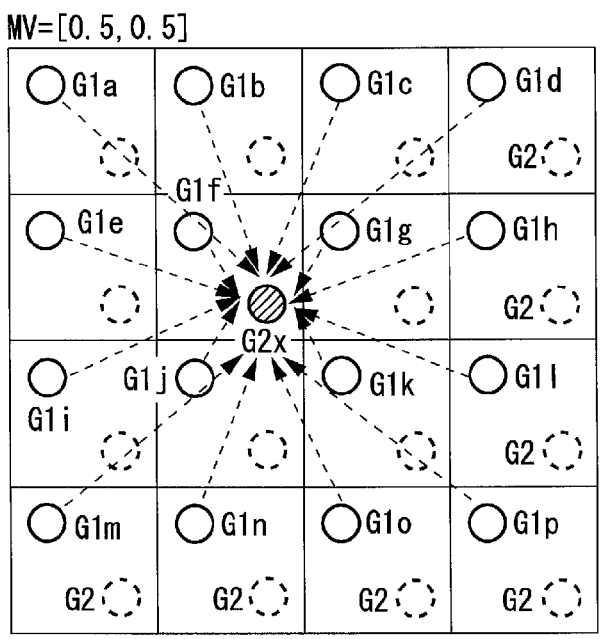

[FIG. 15]
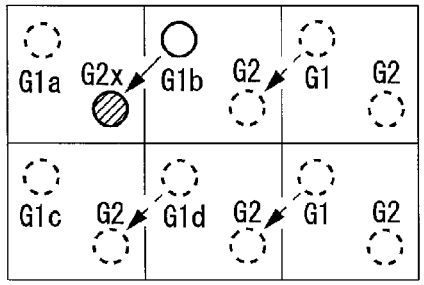
[FIG. 16]
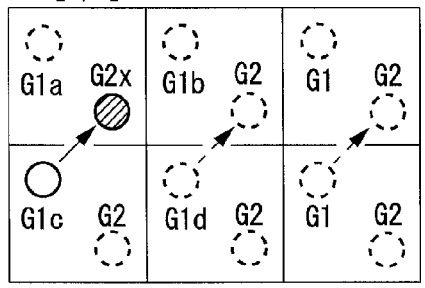
[FIG. 17]
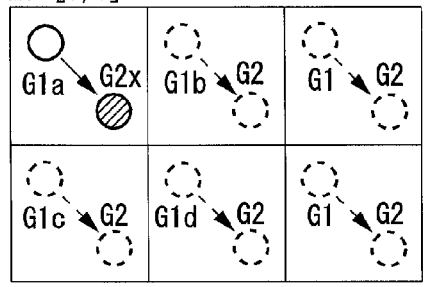
[FIG. 18]
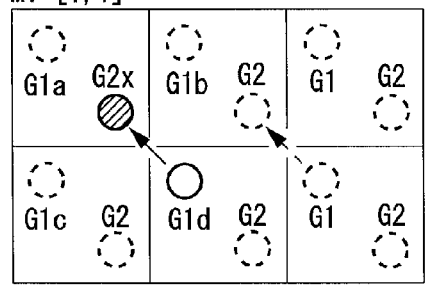

[FIG. 19]
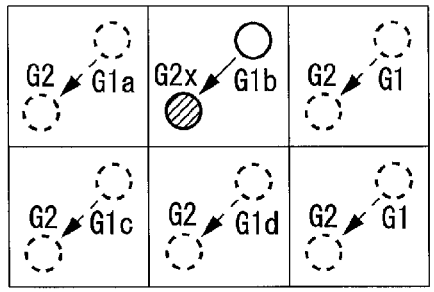
[FIG. 20]
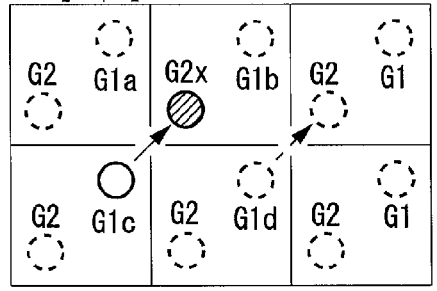
[FIG. 21]
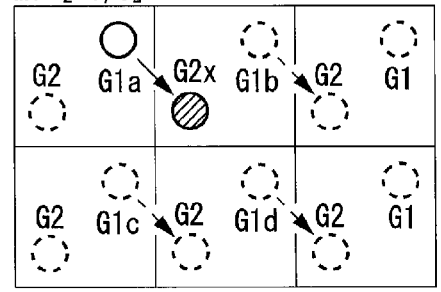
[FIG. 22]
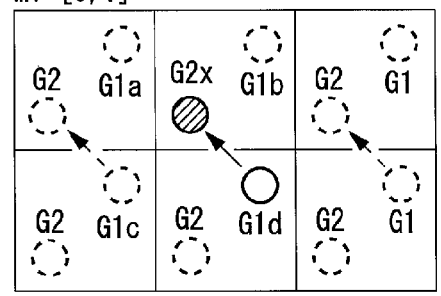

[FIG. 23]
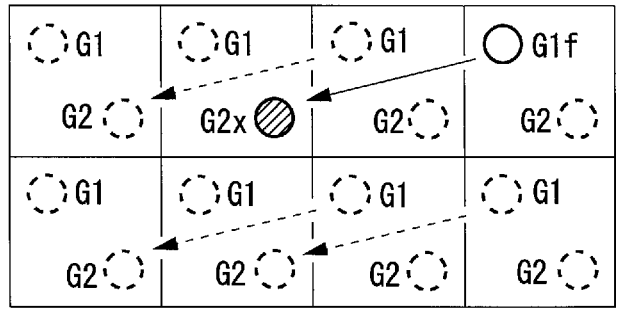
[FIG. 24]
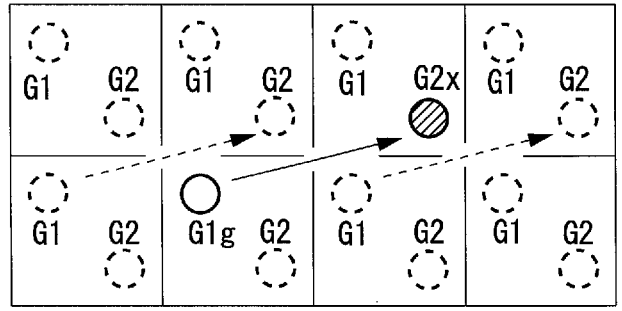
[FIG. 25]
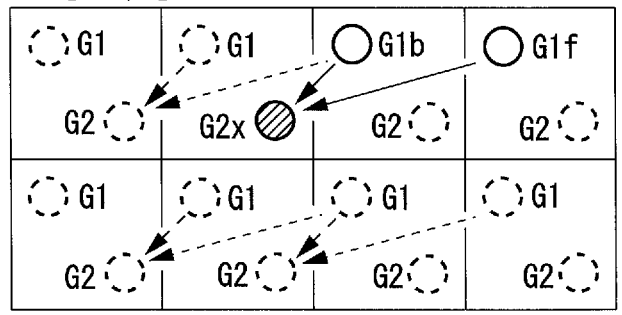

[FIG. 26]

(a): FIRST IMAGE (G1/B)

| G1 | G1 | G1 | G1 | G1 | G1 | B | B | B | B | B | B |
|----|----|----|----|----|----|---|---|---|---|---|---|
| G1 | G1 | G1 | G1 | G1 | G1 | B | B | B | B | B | B |
| G1 | G1 | G1 | G1 | G1 | G1 | B | B | B | B | B | B |
| G1 | G1 | G1 | G1 | G1 | G1 | B | B | B | B | B | B |

(b): SECOND IMAGE (G2/R)

| G2 | G2 | G2 | G2 | G2 | G2 | R | R | R | R | R | R |
|----|----|----|----|----|----|---|---|---|---|---|---|
| G2 | G2 | G2 | G2 | G2 | G2 | R | R | R | R | R | R |
| G2 | G2 | G2 | G2 | G2 | G2 | R | R | R | R | R | R |
| G2 | G2 | G2 | G2 | G2 | G2 | R | R | R | R | R | R |

[FIG. 27]

(a): FIRST IMAGE (G1/B)

| G1 | G1 | G1 | G1 | G1 | G1 | B | B | B | B | B | B |
|----|----|----|----|----|----|---|---|---|---|---|---|
| G1 | G1 | G1 | G1 | G1 | G1 | B | B | B | B | B | B |
| G1 | G1 | G1 | G1 | G1 | G1 | B | B | B | B | B | B |
| G1 | G1 | G1 | G1 | G1 | G1 | B | B | B | B | B | B |

(b): SECOND IMAGE (R/G2)

| R | R | R | R | R | G2 | G2 | G2 | G2 | G2 | G2 |
|---|---|---|---|---|----|----|----|----|----|----|
| R | R | R | R | R | G2 | G2 | G2 | G2 | G2 | G2 |
| R | R | R | R | R | G2 | G2 | G2 | G2 | G2 | G2 |
| R | R | R | R | R | G2 | G2 | G2 | G2 | G2 | G2 |

[FIG. 28]

| | H/2 | | | | | |
|---|---|---|---|---|---|---|
| | G1 | G1 | G1 | G1 | G1 | G1 |
| | G1 | G1 | G1 | G1 | G1 | G1 |
| | G1 | G1 | G1 | G1 | G1 | G1 |
| V | G1 | G1 | G1 | G1 | G1 | G1 |
| | B | B | B | B | B | B |
| | B | B | B | B | B | B |
| | B | B | B | B | B | B |
| | B | B | B | B | B | B |

(a): FIRST IMAGE (G1/B)

| | H/2 | | | | | |
|---|---|---|---|---|---|---|
| | G2 | G2 | G2 | G2 | G2 | G2 |
| | G2 | G2 | G2 | G2 | G2 | G2 |
| | G2 | G2 | G2 | G2 | G2 | G2 |
| V | G2 | G2 | G2 | G2 | G2 | G2 |
| | R | R | R | R | R | R |
| | R | R | R | R | R | R |
| | R | R | R | R | R | R |
| | R | R | R | R | R | R |

(b): SECOND IMAGE (G2/R)

[FIG. 29]

| G1 | G1 | G1 | G1 | G1 | G1 |
|---|---|---|---|---|---|
| G1 | G1 | G1 | G1 | G1 | G1 |
| G1 | G1 | G1 | G1 | G1 | G1 |
| G1 | G1 | G1 | G1 | G1 | G1 |

G1 IMAGE

| B | B | B | B | B | B |
|---|---|---|---|---|---|
| B | B | B | B | B | B |
| B | B | B | B | B | B |
| B | B | B | B | B | B |

B IMAGE

| R | R | R | R | R | R |
|---|---|---|---|---|---|
| R | R | R | R | R | R |
| R | R | R | R | R | R |
| R | R | R | R | R | R |

R IMAGE (a): FIRST FIELD (4:4:4)

| G2 | G2 | G2 | G2 | G2 | G2 |
|---|---|---|---|---|---|
| G2 | G2 | G2 | G2 | G2 | G2 |
| G2 | G2 | G2 | G2 | G2 | G2 |
| G2 | G2 | G2 | G2 | G2 | G2 |

G2 IMAGE

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |

DUMMY DATA

| 0 | 0 | 0 | 0 | 0 | 0 |
|---|---|---|---|---|---|
| 0 | 0 | 0 | 0 | 0 | 0 |
| 0 | 0 | 0 | 0 | 0 | 0 |
| 0 | 0 | 0 | 0 | 0 | 0 |

DUMMY DATA (b): SECOND FIELD (4:4:4)

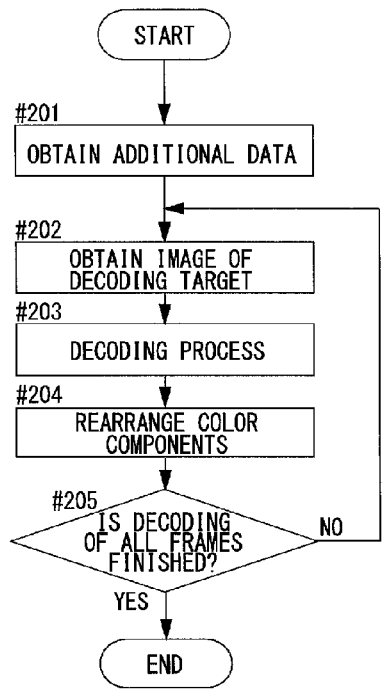

[FIG. 32]
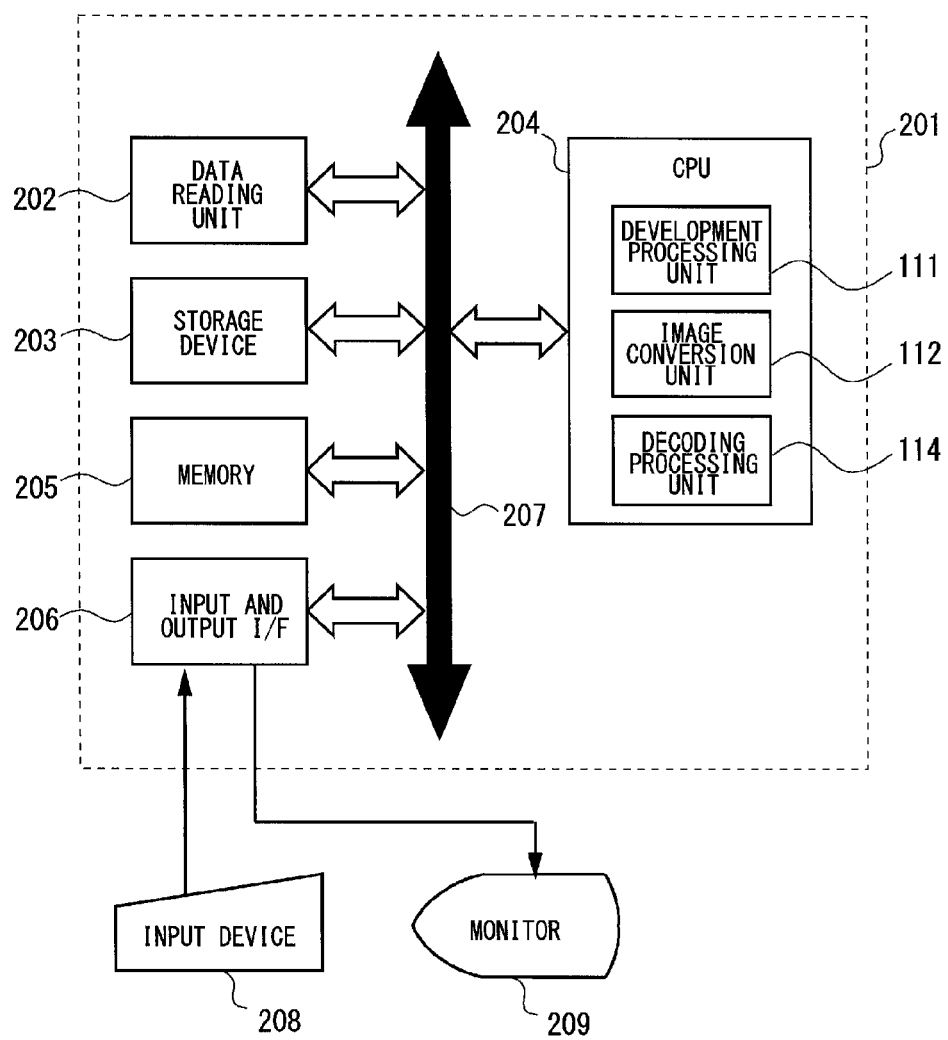

US 9,854,247 B2

MOVING IMAGE COMPRESSION DEVICE, MOVING IMAGE DECODING DEVICE, IMAGE COMPRESSION DEVICE, IMAGE DECODING DEVICE, IMAGING DEVICE, AND NON-TRANSITORY MEDIUM STORING PROGRAM

This application is a U.S. National Stage application claiming the benefit of prior filed International Application Number PCT/JP2013/004219, filed Jul. 8, 2013, in which the International Application claims a priority date of Jul. 9, 2012, based on prior-filed Japanese Application Numbers 2012-153372 and 2012-153373, the entire contents of which are incorporated herein by reference.

TECHNICAL FIELD

The present application relates to a moving image compression device, a moving image decoding device, an image compression device, an image decoding device, an imaging device and a program.

BACKGROUND ART

Regarding shooting of a moving image, there has been proposed an imaging device having an imaging mode for RAW moving image in which an image output from an image sensor is recorded without subjecting it to a development process inside the camera. It is also proposed to separate respective color components from a Bayer array and performs compression coding on each of the respective color components, in such recording of a RAW moving image.
Patent Document 1: Japanese Unexamined Patent Application Publication No. 2011-41144

DISCLOSURE

Problems to be Solved

Incidentally, two same color components of the Bayer array have high correlativity. Accordingly, the efficiency of compression coding of the RAW moving image can be improved by utilizing such correlativity.

Means for Solving the Problems

A moving image compression device as one example of the present invention has an obtaining unit, an image conversion unit, and a compression processing unit. The obtaining unit obtains a RAW moving image having plural frames associated in an order of imaging, the frames having pixels of three different color components which are disposed periodically according to a color array with two rows and two columns. The image conversion unit separates, in a target frame, a first pixel group corresponding to a first color component of odd rows and a second pixel group corresponding to the first color component of even rows from each other, and alternately arrays, in a time base direction, a first image including the first pixel group and a second image including the second pixel group. The compression processing unit performs inter-frame prediction coding compression on the first image and the second image.

An image compression device as another example of the present invention has an obtaining unit, a separating unit, and a compression processing unit. The obtaining unit obtains a RAW image having pixels of plural color components which are disposed two-dimensionally. The separating unit separates a first color component in the RAW image into a first image and a second image. The compression processing unit performs compression processing on the first image based on a subtraction between images of the first image and the second image.

A moving image decoding device as another example of the present invention has an obtaining unit obtaining compressed RAW moving image data, a decoding processing unit, and an image conversion unit. The compressed RAW moving image data are generated by separating, regarding plural frames having pixels of three different color components which are disposed periodically according to a color array with two rows and two columns, a first pixel group corresponding to a first color component of odd rows and a second pixel group corresponding to the first color component of even rows of each frame from each other, and alternately arraying, in a time base direction, a first image including the first pixel group and a second image including the second pixel group, and then performing inter-frame prediction coding compression thereof. The decoding processing unit decodes the compressed RAW moving image data. The image conversion unit rearranges the first image and the second image of decoded RAW moving image data according to the color array.

An image decoding device as another example of the present invention has an obtaining unit obtaining compressed RAW moving image data, a decoding processing unit decoding the compressed RAW moving image data, and an image conversion unit. The compressed RAW moving image data are generated by separating, into a first image and a second image, a first color component in a RAW image having pixels of plural color components which are disposed two-dimensionally, and performing compression processing on the first image based on a subtraction between images of the first image and the second image. The image conversion unit rearranges the first image and the second image of the decoded RAW moving image data according to a predetermined color array.

BRIEF DESCRIPTION OF THE DRAWINGS

FIG. 1 is a diagram illustrating a configuration example of an electronic camera of a first embodiment.

FIGS. 2(a) to (d) are diagram illustrating an example of an array of respective color pixels in a Bayer array.

FIG. 3 is a diagram illustrating a configuration example of a compression processing unit.

FIG. 4 is a diagram illustrating a configuration example of a decoding processing unit.

FIG. 5 is a flowchart illustrating operation of an electronic camera in a RAW moving image recording mode.

FIG. 6 is a diagram illustrating an example of a coding target RAW image.

FIGS. 7(a) to (d) are diagrams illustrating an image generated by rearrangement of color components of a RAW image in the first operation example.

FIG. 8 is a diagram illustrating an example of motion compensation prediction when all RAW images are I frames.

FIG. 9 is a diagram illustrating an example of the motion compensation prediction when RAW images are I frames and P frames.

FIG. 10 is a diagram illustrating an example of the motion compensation prediction when RAW image are an I frame, a P frame, and B frames.

FIG. 11 is a diagram illustrating an example of the motion compensation prediction when RAW images are an I frame, a P frame, and B frames.

FIG. 12 is a diagram illustrating an example of predicting a pixel value by a pixel interpolation process.

FIG. 13 is a diagram illustrating an example of predicting a pixel value by the pixel interpolation process.

FIG. 14 is a diagram illustrating an example of predicting a pixel value by the pixel interpolation process.

FIG. 15 is a diagram illustrating an example of predicting a pixel value by a pixel shifting process.

FIG. 16 is a diagram illustrating an example of predicting a pixel value by the pixel shifting process.

FIG. 17 is a diagram illustrating an example of predicting a pixel value by the pixel shifting process.

FIG. 18 is a diagram illustrating an example of predicting a pixel value by the pixel shifting process.

FIG. 19 is a diagram illustrating an example of predicting a pixel value by the pixel shifting process.

FIG. 20 is a diagram illustrating an example of predicting a pixel value by the pixel shifting process.

FIG. 21 is a diagram illustrating an example of predicting a pixel value by the pixel shifting process.

FIG. 22 is a diagram illustrating an example of predicting a pixel value by the pixel shifting process.

FIG. 23 is a diagram illustrating an example of predicting a pixel value by the pixel shifting process.

FIG. 24 is a diagram illustrating an example of predicting a pixel value by the pixel shifting process.

FIG. 25 is a diagram illustrating an example of predicting a pixel value by the pixel shifting process.

FIGS. 26(a), (b) are diagrams illustrating an image generated by rearrangement of color components of a RAW image in a second operation example.

FIGS. 27(a), (b) are diagrams illustrating an image generated by rearrangement of color components of a RAW image in modification example 1 of the second operation example.

FIGS. 28(a), (b) are diagrams illustrating an image generated by rearrangement of color components of a RAW image in modification example 2 of the second operation example.

FIGS. 29(a), (b) are diagrams illustrating an image generated by rearrangement of color components of a RAW image in a third operation example.

FIGS. 30(a), (b) are diagrams illustrating an image generated by rearrangement of color components of a RAW image in a modification example of the third operation example.

FIG. 31 is a flowchart illustrating an example of a decoding operation of a RAW moving image compressed in the RAW moving image recording mode.

FIG. 32 is a diagram illustrating a configuration example of a moving image decoding device in a second embodiment.

DETAILED DESCRIPTION OF THE EMBODIMENTS

<Description of First Embodiment>

FIG. 1 is a diagram illustrating a configuration example of an electronic camera of a first embodiment as one example of an imaging device, a moving image compression device, and a moving image decoding device.

An electronic camera 100 of a first embodiment has a moving image shooting function, and has a RAW moving image recording mode as one of moving image shooting modes. The electronic camera 100 in the RAW moving image recording mode performs compression coding on a moving image (RAW moving image) in a RAW format before a digital development process and records the processed moving image. Incidentally, the digital development process is an image process to convert a non-processed RAW image into an image equivalent to a photograph. As an example, the digital development process includes a color interpolation process, a gradation conversion process, a white balance adjustment process, and a color conversion process.

The electronic camera 100 has an imaging optical system 101, an image sensor 102, a signal processing unit 103, an image processing engine 104, a first memory 105 and a second memory 106, a recording I/F 107, a monitor 108, and an operating unit 109. Here, the signal processing unit 103, the first memory 105, the second memory 106, the recording I/F 107, the monitor 108 and the operating unit 109 are each connected to the image processing engine 104. In addition, the operating unit 109 is a switch to accept the user's operation (for example, an instruction of moving image shooting, an instruction of mode switching, or the like).

The imaging optical system 101 is made up of plural lenses including, for example, a zoom lens and a focus lens. Note that, for convenience, the imaging optical system 101 is illustrated as one lens in FIG. 1.

The image sensor 102 is a device to image (shoot) an image of a subject made by a luminous flux which passed through the imaging optical system 101. An output of the image sensor 102 is connected to the image processing engine 104. The above-described image sensor 102 may be a solid state image sensor (for example, CCD) of progressive scanning method, or may be a solid state image sensor (for example, CMOS) of XY address method.

Here, on a light receiving surface of the image sensor 102, plural light receiving elements (pixels) are arrayed in a matrix. Then, in pixels of the image sensor 102, plural types of color filters respectively transmitting lights of different color components are disposed according to a predetermined color array. Thus, each pixel of the image sensor 102 outputs an electrical signal corresponding to each color component by color separation by the color filters. For example, in the first embodiment, color filters of red (R), green (G), blue (B) are disposed periodically on the light receiving surface according to a Bayer array with two rows and two columns. As an example, pixels of G, B line up alternately in odd rows of the pixel array of the image sensor 102, and pixels of R, G line up alternately in even rows of the pixel array. Then, in the entire pixel array, the green pixels are disposed to form a checkered pattern. Thus, the image sensor 102 can obtain a color image at a time of shooting. In the description of this specification, a green pixel in an odd row may be described as G1, and a green pixel in an even row may be described as G2. Further, the disposition pattern of respective color pixels in the Bayer array is not limited to the above-described example, and may also be one in which red pixels are disposed in odd rows, and blue pixels are disposed in even rows. Note that disposition examples of respective color pixels in the Bayer array are illustrated in FIG. 2 (a) to (d).

The signal processing unit 103 sequentially performs analog signal processing (correlated double sampling, black level correction, or the like), A/D conversion processing, and digital signal processing (defective pixel correction or the like) on an image signal input from the image sensor 102.

Data of image (RAW image) output from the signal processing unit 103 are input to the image processing engine 104.

The image processing engine 104 is a processor controlling overall operation of the electronic camera 100. For example, the image processing engine 104 performs control of automatic focus (AF) and automatic exposure (AE) by using an image signal input from the image sensor 102.

Further, the image processing engine 104 has a development processing unit 111, an image conversion unit 112, a compression processing unit 113, and a decoding processing unit 114. The development processing unit 111 performs the above-described digital development process on a RAW image.

In the RAW moving image recording mode, the image conversion unit 112 separates respective frames of a RAW moving image into plural images based on color components of pixels. For example, the image conversion unit 112 separates pixels of one frame of the RAW moving image by color and rearrange them. Then, the image conversion unit 112 separates, for example, a first image including a first pixel group corresponding to green components (G1) of odd rows and a second image including a second pixel group corresponding to green components (G2) of even row. Note that an example of the first image and the second image will be described later.

Further, in the RAW moving image recording mode, the image conversion unit 112 alternately arrays the above-described first image and second image in a time base direction and outputs them. Further, when moving image data compressed in the RAW moving image recording mode are decoded, the image conversion unit 112 rearranges the first images and the second images to restore them to the original RAW image.

The compression processing unit 113 divides each frame of a moving image into block units of a predetermined size, and performs compression coding on data of the moving image by using motion compensation prediction. Further, the compression processing unit 113 in the RAW moving image recording mode performs inter-frame prediction coding compression on the first images and the second images arrayed in the time base direction in the image conversion unit 112. Note that a configuration example of the compression processing unit 113 will be described later.

The decoding processing unit 114 decodes data of the moving image which is compression-coded in the compression processing unit 113. Note that a configuration example of the decoding processing unit 114 will be described later.

Note that functional blocks of the development processing unit 111, the image conversion unit 112, the compression processing unit 113 and the decoding processing unit 114 included in the image processing engine 104 can be realized by any processor, memory, and/or another LSI in view of hardware, and can be realized by a program or the like loaded to a memory in view of software.

The first memory 105 temporarily stores data of an image in a preceding step or a succeeding step of image processing. For example, the first memory 105 is an SDRAM which is a volatile recording medium. Further, the second memory 106 stores a program executed in the image processing engine 104 and various data used by this program. For example, the second memory 106 is a non-volatile memory such as a flash memory.

The recording I/F 107 has a connector for connecting a non-volatile recording medium 110. Then, the recording I/F 107 executes writing/reading of data of a moving image to/from the recording medium 110 connected to the connector. The recording medium 110 is hard disk, a memory card incorporating a semiconductor memory, or the like. Note that the memory card is illustrated as an example of the recording medium 110 in FIG. 1.

The monitor 108 is a display device displaying various images. For example, the monitor 108 performs view-finder display while shooting a moving image or reproduction and display of a shot moving image under control by the image processing engine 104.

Next, a configuration example of the compression processing unit 113 will be described with reference to FIG. 3. FIG. 3 illustrates respective parts of the compression processing unit 113 by functional blocks realized by cooperation of hardware and software.

Here, as the image compression coding method for performing motion compensation prediction, for example, MPEG-2 specified in ISO/IEC 13818-2, or the like is known. In the above-described image compression coding method, the compression coding is performed in a frame or between frames by using an I picture, a P picture, or a B picture. The I picture is an intra-frame coded image obtained by coding which is completed only inside the frame. The P picture is an inter-frame prediction coded image obtained by prediction coding using at most 1 reference image. The B picture is an inter-frame bidirectional prediction coded image obtained by prediction coding using at most 2 reference images.

The compression processing unit 113 has a first accumulation unit 11, a subtraction unit 12, an orthogonal conversion unit 13, a quantization unit 14, a coding unit 15, an inverse quantization unit 16, an inverse orthogonal conversion unit 17, an addition unit 18, a second accumulation unit 19, a prediction information generating unit 20, and a prediction unit 21.

The first accumulation unit 11 accumulates a first image and a second image output from the image conversion unit 112. First images and second images accumulated in the first accumulation unit 11 are output to the subtraction unit 12 in the order of input as a coding target image. In addition, an image for which coding is completed is erased sequentially from the first accumulation unit 11.

When the P picture or the B picture is generated, the subtraction unit 12 outputs a subtraction signal (prediction error value) between an input original image and a prediction value, which will be described later, generated in the prediction unit 21. Further, when the I picture is generated, the subtraction unit 12 outputs the signal of the input original image as it is.

When the I picture is generated, the orthogonal conversion unit 13 performs orthogonal conversion on a signal of an original image which is input by passing through the subtraction unit 12. Further, when the P picture or the B picture is generated, the orthogonal conversion unit 13 performs orthogonal conversion on the above-described subtraction signal.

The quantization unit 14 converts a frequency coefficient (orthogonal conversion coefficient) in a block unit input from the orthogonal conversion unit 13 into a quantized coefficient. An output of the quantization unit 14 is input to each of the coding unit 15 and the inverse quantization unit 16.

The coding unit 15 performs variable length coding on the quantized coefficient and prediction information such as a motion vector, and outputs a coded bit stream of the moving image to the outside.

The inverse quantization unit 16 performs inverse quantization on the quantized coefficient in a block unit to decode the frequency coefficient. The inverse orthogonal conversion unit 17 performs inverse orthogonal conversion on the frequency coefficient decoded in the inverse quantization unit 16 to decode the prediction error value (or the signal of the original image).

The addition unit 18 adds the decoded prediction error value and a prediction value, which will be described later, generated in the prediction unit 21. Then, a decoded value (reference image) of the picture output from the addition unit 18 is accumulated in the second accumulation unit 19. In addition, any image which will not be referred in the motion compensation prediction later is erased sequentially from the second accumulation unit 19.

The prediction information generating unit 20 generates prediction information (motion vector and so on) for predicting a coding target image by using a reference image of the second accumulation unit 19. The prediction information is output to the prediction unit 21 and the coding unit 15.

The prediction unit 21 outputs a prediction value predicting a coding target image in a block unit based on the prediction information and the reference image. This prediction value is output to the subtraction unit 12 and the addition unit 18.

Note that when the motion compensation prediction is performed for a certain block, if the coding target image completely matches the prediction value, only prediction information is converted into data. Further, when the coding target image partially matches the prediction value, the prediction information and the subtraction image are converted into data. Further, when the coding target image entirely mismatches with the prediction value, all images of the entire block are converted into data.

Next, a configuration example of the decoding processing unit 114 will be described with reference to FIG. 4. In FIG. 4, respective parts of the decoding processing unit 114 are illustrated as functional blocks realized by cooperation of hardware and software. In addition, the functional blocks of the decoding processing unit 114 may be in common to the functional blocks with the same names of the compression processing unit 113.

The decoding processing unit 114 has a code decoding unit 31, an inverse quantization unit 32, an inverse orthogonal conversion unit 33, an addition unit 34, a first accumulation unit 35, a second accumulation unit 36, and a prediction unit 37.

The code decoding unit 31 decodes an input coded bit stream of moving image and outputs a quantized coefficient and prediction information such as a motion vector. In addition, the decoded quantized coefficient is input to the inverse quantization unit 32, and the decoded prediction information is input to the prediction unit 37.

The inverse quantization unit 32 performs inverse quantization on the quantized coefficient in a block unit to decode the frequency coefficient. The inverse orthogonal conversion unit 33 performs inverse orthogonal conversion on the frequency coefficient decoded in the inverse quantization unit 32 to restore a prediction error value (or a signal of the original image).

The addition unit 34 adds the decoded prediction error value and a prediction value generated in the prediction unit 37, to thereby output a decoded image in a block unit. Then, a decoded value of the image output from the addition unit 34 is input to each of the first accumulation unit 35 and the second accumulation unit 36.

The first accumulation unit 35 accumulates a decoded first image and second image until they are output to the image conversion unit 112. In addition, the image for which output to the image conversion unit 112 is completed is erased sequentially from the first accumulation unit 35. Further, the second accumulation unit 36 accumulates the decoded value of the image as a reference image. In addition, any image which will not be referred in the motion compensation prediction later is erased sequentially from the second accumulation unit 36.

The prediction unit 37 outputs to the addition unit 34 the prediction value predicting a decoding target image in a block unit based on the prediction information and the reference image.

(First Operation Example in the RAW Moving Image Recording Mode)

A first operation example in the RAW moving image recording mode in the first embodiment will be described below. FIG. 5 is a flowchart illustrating operation of an electronic camera in the RAW moving image recording mode. In addition, the process of FIG. 5 is started by, for example, execution of a program by the image processing engine 104 when a RAW moving image shooting mode is activated. In addition, the electronic camera in the first embodiment performs shooting of a moving image at a frame rate of 30 fps, for example.

Step #101: the image processing engine 104 images an image by driving the image sensor 102. An image signal output from the image sensor 102 undergoes signal processing of the signal processing unit 103 and is input to the image processing engine 104. Thus, the image processing engine 104 obtains data of a coding target RAW image which forms one frame of a RAW moving image. Note that FIG. 6 is a diagram illustrating an example of the coding target RAW image. Note that in the following description, the number of horizontal pixels of the RAW image is denoted by H and the number of vertical pixels of the RAW image is denoted by V.

Step #102: the image conversion unit 112 performs rearrangement of color components on the input coding target RAW image.

FIGS. 7(*a*) to (*d*) are diagrams illustrating an image generated by rearrangement of color components of a RAW image in the first operation example. The image conversion unit 112 in the first operation example separates the RAW image into four color components of G1, B, R, G2. Then, the image conversion unit 112 rearranges the separated G1 pixel, B pixel, R pixel, G2 pixel according to positions of the color array. Thus, four images of G1 image, B image, R image, G2 image are generated from one RAW image. The G1 image is an example of the first image, and the G2 image is an example of the second image. In addition, the G1 image, the B image, the R image, the G2 image each have an image size of ¼ of the RAW image (V/2×H/2).

Here, when outputting a moving image to the compression processing unit 113, the image conversion unit 112 in the first operation example arrays the G1 image and the G2 image alternately in the time base direction and outputs them via one channel. Incidentally, when outputting a moving image to the compression processing unit 113, the image conversion unit 112 in the first operation example outputs the B image and the R image via respective separate channels.

Step #103: the compression processing unit 113 performs compression coding on each of plural images generated from the coding target RAW image.

Here, the compression processing unit 113 in the first operation example performs the inter-frame prediction coding compression on the sequentially generated B image, to thereby generate moving image data of B components.

Similarly, the compression processing unit 113 performs the inter-frame prediction coding compression on the sequentially generated R image, to thereby generate moving image data of R components. The B image and the R image alone can be assumed as a monochrome image, and a correlation with an adjacent pixel is high within the image. Accordingly, the compression processing unit 113 can efficiently compress the B image and the R image each as a moving image.

Further, the compression processing unit 113 in the first operation example performs the inter-frame prediction coding compression on the G1 image and the G2 image which are arrayed alternately in the time base direction, to thereby generate moving image data of G components.

The G1 image and the G2 image alone can be assumed as a monochrome image, similarly to the B image and the R image. Further, the G1 image and the G2 image are made by separating same color pixels in one RAW image into odd rows and even rows and rearraying them. The G1 image and the G2 image separated from the same RAW image are both an image of imaging a subject at the same time point, in which a shift in pattern occurs due to a difference in pixel position in the color array, but a correlation between images becomes very high. Further, it is highly possible that substantially the same subject is imaged in the G1 image and the G2 image separated from two RAW images preceding/succeeding in the time base direction, and thus the correlation between images becomes high. Accordingly, in the first operation example, the G1 image and the G2 image arrayed alternately in the time base direction are subjected to the inter-frame prediction coding compression in which an image is divided into blocks and pixel interpolation or pixel shifting in every block is switched adaptively, thereby further improving efficiency of the compression coding of the RAW moving image.

The inter-frame prediction coding in which an image is divided into blocks and pixel interpolation or pixel shifting in every block is switched adaptively can be performed easily by applying, for example, motion compensation prediction coding.

Here, when the inter-frame prediction coding compression is performed on the first image and the second image, the compression processing unit 113 may perform motion compensation prediction as follows. In the following description, a RAW image as the I picture will be referred to as an I frame, a RAW image as the P picture will be referred to as a P frame, and a RAW image as the B picture will be referred to as a B frame. Further, in FIG. 8 to FIG. 11, the first image separated from an n-th RAW image is described as "n−1", and the second image separated from an n-th RAW image is described as "n−2".

FIG. 8 illustrates an example of the motion compensation prediction when all RAW images are I frames. In the example of FIG. 8, the compression processing unit 113 performs intra-frame coding compression on each first image. Further, the compression processing unit 113 refers to the first image (I picture) separated from the same RAW image, and performs the motion compensation prediction in each block by using a decoded value of the first image. The second image is thereby subjected to the inter-frame prediction coding compression. In addition, when it is of the I frame, the first image becomes an I picture, and the second image becomes a P picture.

FIG. 9 illustrates an example of the motion compensation prediction when RAW images are I frames and P frames. The motion compensation prediction in the I frame is the same as in the example of FIG. 8, and thus duplicated descriptions are omitted.

In the example of FIG. 9, in the motion compensation prediction of a first image in the P frame, a first image (I picture/P picture) or a second image (P picture) each separated from the RAW image of one previous frame is taken as a candidate for reference image. Further, in the motion compensation prediction of a second image in the P frame, a second image (P picture) separated from the RAW image of one previous frame or a first image (P picture) separated from the same RAW image is taken as a candidate for reference image. When compressing each image of the P frame, the compression processing unit 113 selects one reference image in every block from among candidates for reference image, and performs the motion compensation prediction of each block by using a decoded value of this reference image. In addition, when it is of the P frame, the first image and the second image are both the P picture.

FIG. 10 and FIG. 11 illustrate an example of the motion compensation prediction when RAW images are an I frame, a P frame, and B frames. The motion compensation prediction in the I frame is the same as in the example of FIG. 8, and thus duplicated descriptions are omitted.

As illustrated in FIG. 10, in the motion compensation prediction of a first image in the P frame, a first image (I picture) or a second image (P picture) each corresponding to the I frame is taken as a candidate for reference image. Further, in the motion compensation prediction of a second image in the P frame, a second image (P picture) of the I frame or a first image (P picture) of the P frame is taken as a candidate for reference image. When compressing each image of the P frame, the compression processing unit 113 selects one reference image in every block from among candidates for reference image, and performs the motion compensation prediction in every block by using a decoded value of this reference image. In addition, when it is of the P frame, the first image and the second image are both the P picture.

Further, as illustrated in FIG. 11, in the motion compensation prediction of a first image and a second image in the B frame, (1) one of a first image and a second image separated from the immediately close I frame (or P frame) on the past side from the B frame and (2) one of a first image and a second image separated from the immediately close I frame (or P frame) on the future side from the B frame are each taken as a candidate for reference image. When compressing each image of the B frame, the compression processing unit 113 selects one each of past and future reference images in every block from among the candidates for reference image, and performs the motion compensation prediction of each block by using decoded values of the two reference images.

Further, the G1 pixel and the G2 pixel extracted from the same color array of the RAW image are each disposed in the same pixel positions in the first image and the second image. However, as described above, a shift in pattern due to a difference in pixel position in the color array occurs between the first image and the second image. Accordingly, when the motion compensation prediction is performed between the first image and the second image, the prediction information generating unit 20 of the compression processing unit 113 is preferred to perform prediction between G1, G2 components as the following (A), (B) in consideration of the difference in pixel position in the color array. Such prediction between the G1, G2 components is performed independently in a block unit of the coding target image.

Now, regarding the descriptions of the following (A), (B), in FIG. 12 to FIG. 25, the array of G1 pixel, G2 pixel in the RAW image is denoted by a circle. Further, in FIG. 12 to FIG. 25, the range of one color array (sample points of the first image and the second image) is denoted by a closing line. Further, between the first image and the second image, a positional shift of the reference pixel of the prediction original image relative to the position of the target pixel in the predicted image will be referred to as a motion vector MV[x, y]. The motion vector MV increases in x by a rightward shift, and decreases in x by a leftward shift. Similarly, the motion vector MV increases in y by a downward shift, and decreases in y by an upward shift. In the following description, examples will be described in which the prediction original image is the first image and the predicted image is the second image, but the relation between them may be reverse.

(A) Prediction by Pixel Interpolation Process

FIG. 12 and FIG. 13 are diagrams illustrating an example of predicting a pixel value by a pixel interpolation process. In the pixel interpolation process, the value of a target pixel of a predicted image is predicted by interpolation values of plural pixels in a prediction original image between the first image and the second image.

FIG. 12 and FIG. 13 illustrate an example in which the value of a target pixel G2$x$ of the predicted image (second image) is obtained by an average value of four pixels (G1$a$ to G1$d$) of the prediction original image (first image) adjacent to the target pixel. In the situations of FIG. 12 and FIG. 13, the pixel value of the target pixel is predicted by an average of four adjacent pixels, and thus a coding distortion included in the coded value of the prediction original image can be suppressed.

In the example of FIG. 12, a G1 pixel is disposed in the upper left position in the color array, and a G2 pixel is disposed in the lower right position in the color array. In the situation of FIG. 12, the pixel G1$a$ and the pixel G2$x$ belong to the same sample points, but the target pixel (G2$x$) is affected by the pixels G1$b$ to G1$d$ by interpolation. Accordingly, the range of reference pixel in the prediction original image shifts 0.5 pixel rightward and 0.5 pixel downward relative to the position of the target pixel (G2$x$). Thus, the motion vector MV in the example of FIG. 12 will be [0.5, 0.5].

Further, in the example of FIG. 13, a G1 pixel is disposed in the upper right position in the color array, and a G2 pixel is disposed in the lower left position in the color array. In the situation of FIG. 13, the pixel G1$b$ and the pixel G2$x$ belong to the same sample points, but the target pixel (G2$x$) is affected by the pixels G1$a$, G1$c$, G1$d$ by interpolation. Accordingly, the range of reference pixel in the prediction original image shifts 0.5 pixel leftward and 0.5 pixel downward relative to the position of the target pixel (G2$x$). Thus, the motion vector MV in the example of FIG. 13 will be [−0.5, 0.5].

The above-described motion compensation prediction by the pixel interpolation process has a high probability of being selected for a block in which there is relatively less change in pattern. The moving image includes many motionless parts, and thus in the compression coding of the first image and the second image, also the frequency for the prediction of FIG. 12 and FIG. 13 to be selected becomes high. Accordingly, the coding part 15 may assign a shortest code when it is the motion compensation prediction by the pixel interpolation process, so as to increase the compression efficiency.

For example, in the compression coding of the first image and the second image in the first operation example, the coding unit 15 may assign a shortest code to the motion compensation prediction by the motion vector MV[0.5, 0.5] in the situation of FIG. 12. Further, in the compression coding of the first image and the second image in the first operation example, the coding unit 15 may assign a shortest code to the motion compensation prediction by the motion vector MV[−0.5, 0.5] in the situation of FIG. 13.

The above-described calculation method of a prediction value depends on the coding method applied. Thus, prediction by the pixel interpolation process is not limited to the examples of FIG. 12 and FIG. 13. For example, as illustrated in FIG. 14, the value of the target pixel G2$x$ of the predicted image (second image) may be obtained by an interpolation value by 16 G1 pixels (for example, an average value or a weighted average value of 16 G1 components) of the prediction original image (first image). In addition, the motion vector MV in the example of FIG. 14 is [0.5, 0.5].

(B) Prediction by Pixel Shifting Process

FIG. 15 to FIG. 25 are diagrams illustrating an example of predicting a pixel value by a pixel shifting process. In the pixel shifting process, the value of a target pixel of a predicted image is predicted by values of pixels in different positions in a prediction original image between the first image and the second image.

FIG. 15 to FIG. 18 are situations in which a G1 pixel is disposed in the upper left position of the color array, and a G2 pixel is disposed in the lower right position of the color array.

In the situation of FIG. 15, the value of a target pixel G2$x$ of a predicted image (second image) is predicted from the value of a pixel G1$b$ located in the upper right position in the RAW image. In the situation of FIG. 15, the reference pixel of the prediction original image (sample point to which G1$b$ belongs) shifts rightward by one pixel relative to the position of the target pixel in the predicted image (sample point to which G2$x$ belongs). Thus, the motion vector MV in the example of FIG. 15 is [1, 0].

In the situation of FIG. 16, the value of the target pixel G2$x$ of the predicted image (second image) is predicted from the value of a pixel G1$c$ located in the lower left position in the RAW image. In the situation of FIG. 16, the reference pixel of the prediction original image (sample point to which G1$c$ belongs) shifts downward by one pixel relative to the position of the target pixel in the predicted image (sample point to which G2$x$ belongs). Thus, the motion vector MV in the example of FIG. 16 is [0, 1]. Incidentally, the motion compensation prediction as in FIG. 15 and FIG. 16 has a high probability of being selected for a block of a pattern including an oblique edge from the lower left to the upper right.

In the situation of FIG. 17, the value of the target pixel G2$x$ of the predicted image (second image) is predicted from the value of a pixel G1$a$ located in the upper left position in the RAW image. In the situation of FIG. 17, the reference pixel of the prediction original image (sample point to which G1$a$ belongs) is in the same position as the target pixel in the predicted image (sample point to which G2$x$ belongs). Thus, the motion vector MV in the example of FIG. 17 is [0, 0].

In the situation of FIG. 18, the value of the target pixel G2$x$ of the predicted image (second image) is predicted from the value of a pixel G1$d$ located in the lower right position in the RAW image. In the situation of FIG. 18, the reference pixel of the prediction original image (sample point to which G1$d$ belongs) shifts rightward by one pixel and downward by one pixel relative to the position of the target pixel in the predicted image (sample point to which G2$x$ belongs). Thus, the motion vector MV in the example of FIG. 18 is [1, 1]. Incidentally, the motion compensation prediction as in FIG.

17 and FIG. 18 has a high probability of being selected for a block of a pattern including an oblique edge from the lower right to the upper left.

On the other hand, FIG. 19 to FIG. 22 are situations in which a G1 pixel is disposed in the upper right position of the color array, and a G2 pixel is disposed in the lower left position of the color array.

In the situation of FIG. 19, the value of a target pixel G2x of a predicted image (second image) is predicted from the value of a pixel G1b located in the upper right position in the RAW image. In the situation of FIG. 19, the reference pixel of the prediction original image (sample point to which G1b belongs) is in the same position as the target pixel in the predicted image (sample point to which G2x belongs). Thus, the motion vector MV in the example of FIG. 19 is [0, 0].

In the situation of FIG. 20, the value of the target pixel G2x of the predicted image (second image) is predicted from the value of a pixel G1c located in the lower left position in the RAW image. In the situation of FIG. 20, the reference pixel of the prediction original image (sample point to which G1c belongs) shifts leftward by one pixel and downward by one pixel relative to the position of the target pixel in the predicted image (sample point to which G2x belongs). Thus, the motion vector MV in the example of FIG. 20 is [−1, 1]. Incidentally, the motion compensation prediction as in FIG. 19 and FIG. 20 has a high probability of being selected for a block of a pattern including an oblique edge from the lower left to the upper right.

In the situation of FIG. 21, the value of the target pixel G2x of the predicted image (second image) is predicted from the value of a pixel G1a located in the upper left position in the RAW image. In the situation of FIG. 21, the reference pixel of the prediction original image (sample point to which G1a belongs) shifts leftward by one pixel with respect to the position of the target pixel in the predicted image (sample point to which G2x belongs). Thus, the motion vector MV in the example of FIG. 21 is [−1, 0].

In the situation of FIG. 22, the value of the target pixel G2x of the predicted image (second image) is predicted from the value of a pixel G1d located in the lower right position in the RAW image. In the situation of FIG. 22, the reference pixel of the prediction original image (sample point to which G1d belongs) shifts downward by one pixel relative to the position of the target pixel in the predicted image (sample point to which G2x belongs). Thus, the motion vector MV in the example of FIG. 22 is [0, 1]. Incidentally, the motion compensation prediction as in FIG. 21 and FIG. 22 has a high probability of being selected for a block of a pattern including an oblique edge from the lower right to the upper left.

In FIG. 15 to FIG. 22, examples in which a pixel which is obliquely adjacent at 45 degrees in the RAW image relative to the target pixel is used for prediction are described, but the present invention is not limited to the above-described examples. As other examples, FIG. 23 to FIG. 25 will be described. Note that FIG. 23 to FIG. 25 are situations where a G1 pixel is disposed in the upper left position of the color array, and a G2 pixel is disposed in the lower right position of the color array.

FIG. 23 illustrates an example in which the value of the target pixel G2x of the predicted image (second image) is predicted from the value of a pixel G1f belonging to the color array in the second position to the right. The motion vector MV in the example of FIG. 23 is [2, 0].

FIG. 24 illustrates an example in which the value of the target pixel G2x of the predicted image (second image) is predicted from the value of a pixel G1g belonging to the color array in the lower left position. The motion vector MV in the example of FIG. 24 is [1, 1]. Incidentally, the motion compensation prediction as in FIG. 23 and FIG. 24 has a high probability of being selected for a block of a pattern including an edge slanted by approximately 18.4 degrees ($=\tan^{-1}(1/3)$) from the lower left to the upper right.

FIG. 25 illustrates an example in which the value of the target pixel G2x of the predicted image (second image) is predicted from the average value of a pixel G1g belonging to the color array in the next position to the right and a pixel G1f belonging to a color array in the second position to the right. The motion vector MV in the example of FIG. 25 is [1.5, 0]. Incidentally, the motion compensation prediction as in FIG. 25 has a high probability of being selected for a block of a pattern including an edge slanted by approximately 26.6 degrees ($=\tan^{-1}(1/2)$) from the lower left to the upper right.

The compression processing unit 113 selects, for a block of a pattern including an oblique edge, prediction by the pixel shifting process of FIG. 15 to FIG. 25 according to the angle and the direction of an edge. Thus, the prediction error between the first image and the second image can be made small, and the coding can be performed more efficiently.

In #103, by the pixel interpolation process illustrated in FIG. 12 to FIG. 14 and the pixel shifting process of FIG. 15 to FIG. 22, the compression processing unit 113 can set the searching range for motion vector to a range of ±1 pixel difference in a spatial direction from the position of the target pixel. Further, by the pixel shifting process of FIG. 23 to FIG. 25, the compression processing unit 113 can set the searching range for motion vector to a range of ±2 pixel difference in a spatial direction from the position of the target pixel.

Incidentally, as compared to the motion compensation prediction with the first image and the second image separated from different RAW images, the frequency that the above-described pixel interpolation process and pixel shifting process can be applied becomes high in the motion compensation prediction with the first image and the second image separated from the same RAW image. Accordingly, in the motion compensation prediction with the first image and the second image separated from the same RAW image, the compression processing unit 113 can set a narrow searching range for motion vector by the pixel interpolation process or the pixel shifting process, enabling to suppress the calculation load.

Step #104: the image processing engine 104 records data of the compression-coded image (#103) in the recording medium 110 via the recording I/F 107.

Step #105: the image processing engine 104 judges whether or not an instruction to end the shooting of moving image is accepted or not. When the above requirement is satisfied (YES side), the process proceeds to #106. On the other hand, when the above requirement is not satisfied (NO side), the process returns to #101, and the image processing engine 104 repeats the above operation. By looping from #101 to the No side of #105, the frames of RAW images which are obtained sequentially are subjected to compression coding after replacement of color components, and consequently the moving image is recorded in the recording medium.

Step #106: the image processing engine 104 generates additional data of the RAW moving image. The additional data contain information used for decoding the compressed RAW moving image, such as the image size of the original RAW image and the pattern of the color array, the rearrangement method of images by the image conversion unit 112 (pixel arrays and image sizes of first image and second image), and the like.

Then, the image processing engine 104 in #106 records the above-described additional data in a header region of a compressed RAW moving image file including the compressed RAW moving image data. Thus, the description of the flowchart of FIG. 5 is finished.

Note that all operation examples of the RAW moving image recording mode which will be described below are modification examples of the above-described first operation example, in which the rearrangement of RAW images in the image conversion unit 112 (#102) differs. Accordingly, in the following description of operation examples, parts different from the above-described first operation example will be described according to the flowchart of FIG. 5, and any description overlapping with the above-described first operation example is omitted.

(Second Operation Example in the RAW Moving Image Recording Mode)

FIGS. 26(a), (b) are diagrams illustrating an image generated by rearrangement of color components of a RAW image in a second operation example.

In the situation of the second operation example, the image conversion unit 112 in #102 separates the RAW image into four color components of G1, B, R, G2. By rearrangement of pixels, the image conversion unit 112 generates from one RAW image a first image and a second image which each include two color components. Then, when outputting a moving image to the compression processing unit 113, the image conversion unit 112 in #102 alternately arrays the first image and the second image in the time base direction and outputs them via one channel.

Here, the first image in the second operation example is generated from G1 pixels and B pixels of the RAW image (FIG. 26(a)). In this first image, the G1 pixels and the B pixels are disposed in a state of being separated in the horizontal direction. On the left side of the first image, the G1 pixels are arrayed according to the position of the color array in the RAW image, forming a monochrome image with G1 components. Further, on the right side of the first image, the B pixels are arrayed according to the position of the color array in the RAW image, forming a monochrome image with B components.

The second image in the second operation example is generated from G2 pixels and R pixels of the RAW image (FIG. 26(b)). In this second image, the G2 pixels and the R pixels are disposed in a state of being separated in the horizontal direction. On the left side of the second image, the G2 pixels are arrayed according to the position of the color array in the RAW image, forming a monochrome image with G2 components. Further, on the right side of the second image, the R pixels are arrayed according to the position of the color array in the RAW image, forming a monochrome image with R components. In addition, the image sizes of the first image and the second image in the horizontal direction in the second operation example are the same as the RAW image, and the image sizes thereof in the vertical direction are ½ of the RAW image.

Further, in the situation of the second operation example, the compression processing unit 113 in #103 performs the inter-frame prediction coding compression on the first image and the second image which are alternately arrayed in the time base direction, and thereby generate data of the compressed moving image. Regarding the compression of the left side part of the first image and the second image, the compression processing unit 113 may perform the inter-frame prediction coding compression similarly to the situation of the G1 image and the G2 image in the above-described first operation example. Note that the right side part of the first image and the right side part of the second image have different color components. Accordingly, the inter-frame prediction coding of the compression processing unit 113 functions efficiently between the right side parts of first images of different frames, or between the right side parts of second images of different frames, that is, between the same color components. However, between the right side part of the first image and the right side part of the second image of the same frame, that is, between different color components, it is substantially equivalent to the compression of intra-frame coding.

In the situation of the above-described second operation example, regarding the compression of G1 components of the first image and G2 components of the second image, substantially the same effects as the inter-frame prediction coding compression of the G1 image and the G2 image in the first operation example can be obtained.

Note that when the image sizes of the first image and the second image in the horizontal direction are the same as the RAW image and the image sizes of the first image and the second image in the vertical direction are ½ of the RAW image, it can be easily applied to a compression processing device corresponding to an inter-field prediction coding compression which alternately compresses odd field and even field of a moving image. It can be easily applied also to a compression processing device corresponding to a prediction coding compression between two visual points which compresses left and right visual point images of a moving image.

Further, FIGS. 27(a), (b) are diagrams illustrating an image generated by rearrangement of color components of a RAW image in modification example 1 of the second operation example. The example of FIG. 27 differ from the example of FIG. 26 in that G2 pixels are arrayed on the right side of the second image and R pixels are arrayed on the left side of the second image.

In the situation of FIG. 27, when performing the motion compensation prediction of the G1 and G2 components between the first image and the second image, the compression processing unit 113 in #103 may perform position correction of an amount of H/2 in the x direction in consideration of a positional shift between the region of G1 pixels and the region of G2 pixels. For example, the compression processing unit 113 may add an offset of [−H/2,0] to the motion vector MV. Thus, substantially the same effects as those in the above-described situation of FIG. 26 can be obtained.

Further, FIGS. 28(a), (b) are diagrams illustrating an image generated by rearrangement of color components of a RAW image in modification example 2 of the second operation example. In the example of FIG. 28, the image sizes of the first image and the second image in the horizontal direction are ½ of the RAW image, and the image sizes thereof in the vertical direction are the same as the RAW image. Then, in the first image of FIG. 28, G1 pixels and B pixels are disposed in a state of being separated in the vertical direction. On the upper side of the first image, G1 pixels are arrayed according to the position of the color array in the RAW image, and on the lower side of the first image, B pixels are arrayed according to the position of the color array in the RAW image. Further, in the second image of FIG. 28, G2 pixels and R pixels are disposed in a state of being separated in the vertical direction. On the upper side of the second image, G2 pixels are arrayed according to the position of the color array in the RAW image, and on the lower side of the second image, R pixels are arrayed according to the position of the color array in the RAW image. In the second image of FIG. 28 also, substantially the same effects as those in the above-described situation of FIG. 26 can be obtained.

(Third Operation Example in the RAW Moving Image Recording Mode)

FIGS. 29(a), (b) are diagrams illustrating an image generated by rearrangement of color components of a RAW image in a third operation example.

In the situation of the third operation example, the image conversion unit 112 in #102 separates the RAW image into four color components of G1, B, R, G2. Similarly to the first operation example, the image conversion unit 112 generates from one RAW image four images of G1 image, B image, R image, G2 image. Then the image conversion unit 112 groups these images to generate a moving image frame in what is called a 4:4:4 format.

In the example of FIG. 29, the image conversion unit 112 makes the group of a first field include the G1 image, the B image, and the R image. Further, the image conversion unit 112 makes the group of a second field include the G2 image and dummy data corresponding to the B image and the R image for corresponding to the 4:4:4 format. Then the image conversion unit 112 arrays the above-described first field and second field alternately in the time base direction and outputs them.

In the situation of the third operation example, the compression processing unit 113 in #103 performs the intra-frame compression on each of the G1 image, the B image, and the R image of the first field. Further, the compression processing unit 113 may perform the inter-frame prediction coding compression on the G2 image of the second field with reference to the G1 image, similarly to the above-described first operation example.

In the situation of the third operation example, regarding the inter-frame prediction coding compression of the second image, substantially the same effects as those in the first operation example can be obtained. In addition, with the configuration of FIG. 29, when the G1 image, the B image, and the R image of the first field are decoded, a moving image can be reproduced in a simple manner without decoding the second field.

Further, FIGS. 30(a), (b) are diagrams illustrating an image generated by rearrangement of color components of a RAW image in a modification example of the third operation example. In the example of FIG. 30, the image conversion unit 112 makes the group of a first field include the G1 image, the B image, and dummy data. Further, the image conversion unit 112 makes the group of a second field include the G2 image, the R image, and dummy data. In this example of FIG. 30, regarding the inter-frame prediction coding compression of the second image, substantially the same effects as those in the first operation example can be obtained.

(Decoding Operation Example of RAW Moving Image)

An example of decoding operation of a RAW moving image which is compressed in the RAW moving image recording mode will be described below with reference to a flowchart of FIG. 31. In addition, the processing of FIG. 31 is started by execution of a program by the image processing engine 104. Further, in the example of FIG. 31, it is assumed that a compressed RAW moving image file generated in the RAW moving image recording mode is recorded in the recording medium 110.

Step #201: the image processing engine 104 refers to additional data included in a header region in the compressed RAW moving image file generated in the above-described RAW moving image recording mode. Thus, the image processing engine 104 obtains information such as the image size of the original RAW image and the pattern of the color array, the rearrangement method of images by the image conversion unit 112 (pixel arrays, image sizes of first image and second image), and the like.

Step #202: the image processing engine 104 obtains from the recording medium 110 data of the image as a decoding target from the compressed RAW moving image file.

Step #203: the image processing engine 104 performs a decoding process of the image obtained in #202. The decoding process in #203 is an inverse process of the compression coding in #103 in the RAW moving image recording mode.

For example, the image compressed by using the motion compensation prediction is decoded in a block unit by addition of a decoded prediction error value and a prediction value of the reference image. Further, in decoding of the first image including G1 components and the second image including G2 components, the above-described pixel interpolation process or pixel shifting process is applied to decode the images.

In step #204, the image conversion unit 112 performs rearrangement of the images decoded in #203 based on the above-described information obtained from the additional data. The rearrangement process of #204 is an inverse process of #102 in the RAW moving image recording mode. The image conversion unit 112 obtains G1 pixels and G2 pixels of the amount of one frame from the first image and the second image which are alternately arrayed in the time base direction. Then, the image conversion unit 112 rearranges the G1, B, R, G2 pixels to restore one frame of the RAW image before compression. In addition, the restored RAW image before compression is retained in, for example, the recording medium 110 or the memory in the electronic camera 100.

Step #205: the image processing engine 104 judges whether the decoding of all frames of the compressed RAW moving image file is completed or not.

When the above requirement is satisfied (YES side), the image processing engine 104 ends the process of the flowchart of FIG. 32. The RAW image is in a state that the respective color components are disposed in a mosaic form according to the Bayer array, and thus the user, when reproducing the moving image, needs to perform development process on the RAW image. In addition, regarding the RAW moving image, since the user can freely perform the development process after shooting, the freedom of image expression largely improves.

On the other hand, when the above requirement is not satisfied (NO side), the process returns to #202, and the image processing engine 104 repeats the above operation. By looping from #202 to the NO side of #205, the frames of the RAW moving image before compression are restored sequentially. Thus, the description of FIG. 31 is finished.

<Description of Second Embodiment>

FIG. 32 is a diagram illustrating a configuration example of a moving image decoding device in a second embodiment. The moving image decoding device in the second embodiment is a computer in which a program for decoding the above-described compressed RAW moving image file is installed.

A computer 201 illustrated in FIG. 32 has a data reading unit 202, a storage device 203, a CPU 204, a memory 205 and an input and output I/F 206, and a bus 207. The data reading unit 202, the storage device 203, the CPU 204, the memory 205 and the input and output I/F 206 are connected with each other via the bus 207. Further, to the computer 201, an input device 208 (a keyboard, a pointing device, and/or the like) and the monitor 209 are connected via the input and output I/F 206. In addition, the input and output I/F 206 accepts various inputs from the input device 208 and outputs data for display to a monitor 209.

The data reading unit 202 is used when data of the above-described compressed RAW moving image file and a program are read from the outside. The data reading unit 202 is a reading device (reading device for optical disk, magnetic disk, magneto-optical disk) for obtaining data from a removable recording medium or a communication device (USB interface, LAN module, wireless LAN module, or the like) for communicating with an external device in accordance with publicly known communication standards.

The storage device 203 is, for example, a storage medium such as a hard disk or a non-volatile semiconductor memory. In this storage device 203, the above-described program and various data needed for executing the program are stored. In addition, in the storage device 203 it is also possible to store data of a compressed RAW moving image file read from the data reading unit 202, or the like.

The CPU 204 is a processor performing overall control of respective units of the computer 201. By execution of a program, this CPU 204 functions as the development processing unit 111, the image conversion unit 112, and the decoding processing unit 114 of the first embodiment.

The memory 205 temporarily stores various calculation results in the program. This memory 205 is, for example, a volatile SDRAM.

Here, in the moving image decoding device in the second embodiment, the compressed RAW moving image file is obtained from the data reading unit 202 or the storage device 203, and the CPU 204 executes the respective processes of the flowchart of FIG. 31.

In such a second embodiment, substantially the same effects as those in the decoding operation example of the RAW moving image in the first embodiment can be obtained.

<Supplementary Items of the Embodiments>

(Supplement 1): when compression coding is performed in the above-described embodiments, the B pixel value and the R pixel value may be replaced with a differential value with the G pixel value in the corresponding color array.

(Supplement 2): further, in the above-described embodiments, a moving image may be coded based on a method generally called AVC (Advanced Video Coding) specified in ISO/IEC 14496-10, or a moving image may be coded based on another coding method including at least inter-field prediction coding or motion compensation prediction equivalent to prediction coding between two visual points.

(Supplement 3): moreover, the image signal of each frame of a moving image to be subjected to moving image compression may be an image signal retaining output gradations of an image sensor, or may be an image signal converted into less gradations, that is, quantized.

For example, after an output of the image sensor converts an image signal with 14 bits per sample into an image signal with 10 bits per sample by uniform quantization or weighted quantization having a small quantization error of a low value, the moving image compression device may perform moving image compression. The moving image compression device may perform quantization with predetermined properties or perform quantization with properties determined according to image specifications or image contents.

On the other hand, after decoding data of compressed moving image, the moving image decoding device may restore the image signal before compression by performing inverse quantization based on quantization properties before moving image compression. Incidentally, information indicating the above-described quantization properties before moving image compression may for example be recorded by the moving image compression device in a header region of the image file, or the like by attaching them to the data of moving image, or be transmitted to a device in a later stage by the moving image compression device by attaching them to the data of compressed moving image. For example, in the above situation, as information indicating the quantization properties, a code indicating whether it is a predetermined standard quantization property or not, a code indicating one of predetermined plural quantization properties, table information indicating inverse quantization input and output properties to be used for decoding, and/or the like may be recorded or transmitted.

The many features and advantages of the embodiments are apparent from the detailed specification, and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to exact construction and operation illustrated and described, and accordingly all suitable modifications and equivalents may be resorted to, falling within the scope thereof.

The invention claimed is:

1. A moving image compression device, comprising a processor and a memory, the processor being configured to:
   obtain a RAW moving image having plural frames associated in an order of imaging, the frames having pixels of three different color components which are disposed periodically according to a color array with two rows and two columns;
   separate, in a target frame, a first pixel group corresponding to a first color component of odd rows, a second pixel group corresponding to the first color component of even rows, and a third pixel group corresponding to a second color component different from the first color component;
   alternately array, in a time base direction, a first image including the first pixel group and a second image including the second pixel group; and
   perform inter-frame prediction coding compression on the first image, the second image, and a third image including the third pixel group.

2. The moving image compression device according to claim 1, wherein
   the processor performs motion compensation prediction
   (i) between the first image and the second image and
   (ii) among a plurality of the third images.

3. The moving image compression device according to claim 2, wherein
   the processor divides an image into blocks and executes, by adaptively switching in each block,
   a pixel interpolation process to predict a value of a target pixel of a predicted image by an interpolation value of plural pixels in a prediction original image between the first image and the second image, or
   a pixel shifting process to predict a value of a target pixel of a predicted image from a value of a pixel in a different position in a prediction original image between the first image and the second image.

4. The moving image compression device according to claim 1, wherein the processor further:
  generates the first image by performing rearrangement so that the first image further includes a pixel group of a second color component different from the first color component, and that the first pixel group and the pixel group of the second color component are separated in a horizontal direction, and
  generates the second image by performing rearrangement so that the second image further includes a pixel group of a third color component different from the first color component and the second color component, and that the second pixel group and the pixel group of the third color component are separated in the horizontal direction.

5. The moving image compression device according to claim 4, wherein
  the processor disposes a region of the first pixel group in the first image and a region of the second pixel group in the second image in a common position in a spatial direction.

6. The moving image compression device according to claim 5, wherein
  the processor, when performing motion compensation prediction between the first image and the second image, sets a searching range for motion vector of the first image and the second image separated from a same frame to be small compared to a searching range for motion vector of the first image and the second image separated from a different frame.

7. The moving image compression device according to claim 4, wherein
  the processor disposes a region of the first pixel group in the first image and a region of the second pixel group in the second image in opposite positions in the horizontal direction.

8. The moving image compression device according to claim 7, wherein
  the processor, when performing motion compensation prediction between the first image and the second image, performs position correction corresponding to positions of the region of the first pixel group and the region of the second pixel group and sets a searching range for motion vector of the first image and the second image separated from a same frame to be small compared to a searching range for motion vector of the first image and the second image separated from a different frame.

9. The moving image compression device according to claim 6, wherein
  the processor sets the searching range for motion vector in the region of the first pixel group and the region of the second pixel group to a range of one pixel difference in the spatial direction from a reference pixel.

10. The moving image compression device according to claim 1, wherein
  the processor and an associated memory are further configured to record, in a manner associated with moving image data after compression, additional data indicating a pixel array of the first image and the second image.

11. An imaging device, comprising:
  an image sensor imaging a RAW moving image; and
  the moving image compression device according to claim 1.

12. A non-transitory computer-readable storage medium storing instructions thereon that, when executed by a processor, cause the processor to:
  obtain a RAW moving image which has plural frames associated in an order of imaging, the frames having pixels of three different color components which are disposed periodically according to a color array with two rows and two columns;
  separate, in a target frame, a first pixel group which corresponds to a first color component of odd rows, a second pixel group which corresponds to the first color component of even rows, and a third pixel group which corresponds to a second color component different from the first color component;
  alternately array, in a time base direction, a first image which includes the first pixel group and a second image which includes the second pixel group; and
  perform inter-frame prediction coding compression on the first image, the second image, and a third image which includes the third pixel group.

13. An image compression device, comprising a processor and a memory, the processor being configured to:
  obtain a RAW image having pixels of plural color components which are disposed two-dimensionally;
  separate a first color component in the RAW image into a first image and a second image;
  perform compression processing on the first image based on a subtraction between images of the first image and the second image; and
  perform compression processing on a third image in which a second color component different from the first color component is separated from the RAW image.

14. A moving image decoding device, comprising a processor and a memory, the processor being configured to:
  obtain compressed RAW moving image data generated by separating, regarding plural frames having pixels of three different color components which are disposed periodically according to a color array with two rows and two columns, a first pixel group corresponding to a first color component of odd rows, a second pixel group corresponding to the first color component of even rows of each frame, and a third pixel group corresponding to a second color component different from the first color component;
  alternately array, in a time base direction, a first image including the first pixel group and a second image including the second pixel group;
  then perform inter-frame prediction coding compression on the first image, the second image, and a third image including the third pixel group;
  decode the compressed RAW moving image data; and
  rearrange the first image and the second image of decoded RAW moving image data according to the color array.

15. The moving image decoding device according to claim 14, wherein
  the processor divides an image into blocks and executes, by adaptively switching in each block,
  a pixel interpolation process to obtain by an interpolation value of plural pixels in one image between the first image and the second image, a value of a target pixel in another image, or
  a pixel shifting process to obtain a value of a target pixel in the other image from a value of a pixel in a different position in the one image between the first image and the second image.

16. The moving image decoding device according to claim 14, wherein the processor obtains additional data indicating a pixel array of the first image and the second image together with the compressed RAW moving image data, and the processor rearranges the first image and the second image according to the color array by using the additional data.

17. An image decoding device, comprising a processor and a memory, the processor being configured to:

obtain compressed RAW moving image data generated by separating, into a first image and a second image, a first color component in a RAW image having pixels of plural color components which are disposed two dimensionally;

perform compression processing on the first image based on a subtraction between images of the first image and the second image;

perform compression processing on a third image in which a second color component different from the first color component is separated from the RAW image;

decode the compressed RAW moving image data; and rearrange the first image and the second image of the decoded RAW moving image data according to a predetermined color array.

18. A non-transitory computer-readable storage medium storing instructions thereon that, when executed by a processor, cause the processor to:

obtain compressed RAW moving image data generated by separating, regarding plural frames having pixels of three different color components which are disposed periodically according to a color array with two rows and two columns, a first pixel group which corresponds to a first color component of odd rows, a second pixel group which corresponds to the first color component of even rows of each frame, and a third pixel group which corresponds to a second color component different from the first color component;

alternately array, in a time base direction, a first image which includes the first pixel group and a second image which includes the second pixel group;

then perform inter-frame prediction coding compression on the first image, the second image, and a third image which includes the third pixel group;

decode the compressed RAW moving image data; and rearrange the first image and the second image of decoded RAW moving image data according to the color array.

19. The moving image compression device according to claim 8, wherein the processor sets the searching range for motion vector in the region of the first pixel group and the region of the second pixel group to a range of one pixel difference in the spatial direction from a reference pixel.

* * * * *